No. 690,313. Patented Dec. 31, 1901.
G. F. NELSON.
TROLLEY POLE ATTACHMENT.
(Application filed May 16, 1901.)
(No Model.)
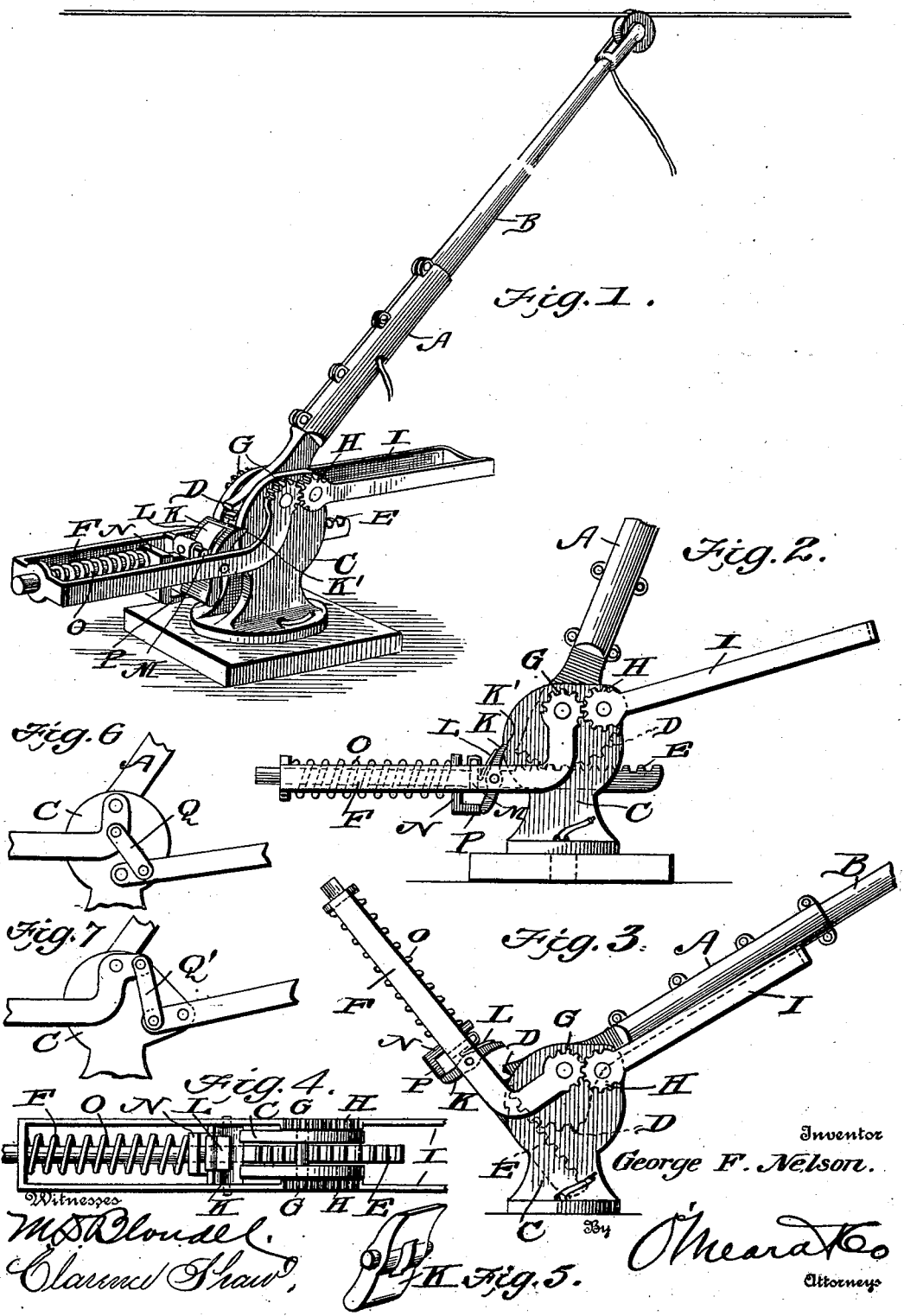

UNITED STATES PATENT OFFICE.

GEORGE F. NELSON, OF WASHINGTON, DISTRICT OF COLUMBIA.

TROLLEY-POLE ATTACHMENT.

SPECIFICATION forming part of Letters Patent No. 690,313, dated December 31, 1901.

Application filed May 16, 1901. Serial No. 60,588. (No model.)

*To all whom it may concern:*

Be it known that I, GEORGE F. NELSON, a citizen of the United States, residing in the city of Washington and District of Columbia, have invented a new and useful Trolley-Pole Attachment, of which the following is a specification.

This invention is a trolley-pole attachment, the object being to provide an appliance which can be attached to any and all of the trolley-poles now in use, the object of the invention being to prevent the trolley-pole springing forwardly when the trolley-wheel jumps the wire.

Trolley-poles are usually attached to the car by means of a spring mechanism for the purpose of holding the wheel in contact with the wire, and when the wheel jumps the wire the pole frequently damages the stay-wires and insulators before the pole can be pulled down.

The object of the present invention is to provide a spring-actuated means for holding the pole in contact with the wire and which will automatically release the pole the moment the wheel jumps the wire and cause the said pole to drop, so that it will not contact with the insulators or stay-wires.

Another object of the invention is to provide a cushion device in connection with the releasing mechanism, whereby the force of the drop of the pole will be taken up and compensated, thereby avoiding the shock which would otherwise occur.

With these objects in view my invention consists, essentially, in providing a suitable support to which is attached a pole-socket carrying a toothed segment at its lower end, which segment is adapted to engage a rack-bar carried by a frame pivotally connected to the support, said frame being operatively connected to a bail which is intended to relieve the shock incidental to the descent of the pole, the frame and bar being provided with means for normally holding the pole in contact with the wire and also with means for automatically releasing the locking parts the moment the wheel jumps the wire.

The invention consists also in certain details of construction and novelties of combination, all of which will be fully described hereinafter and pointed out in the claims.

In the drawings forming part of this specification, Figure 1 is a perspective view showing the practical application of my invention. Fig. 2 is a side elevation showing the position of the various parts just prior to releasing the pole. Fig. 3 is a side elevation showing the positions of the various parts after the pole has been released and dropped. Fig. 4 is a detail plan view, the pole and socket being omitted. Fig. 5 is an enlarged detail view of the pawl. Figs. 6 and 7 show slightly-modified forms of construction.

In carrying out my invention I employ a pole-socket A, in which the trolley-pole B is fitted, the said socket being reduced at its lower end and pivoted between the members of the bracket-support C, said bracket-support being attached to the top of the car in any suitable manner. The lower end of the socket is formed into a toothed segment D, the teeth of which engage the rack-bar E, working between the members of the bracket-support C, the forward end of the bar E being round in cross-section and working through the forward member of an essentially rectangular shaped frame F, said frame being pivoted at its rear end to the supporting-bracket C, the pivotal ends of the frame being formed into toothed segments G, which mesh with similar segments H, formed upon the pivotal ends of the supporting-bail I, the inner or forward ends of said bail being pivotally connected to the supporting-bracket, as most clearly shown.

The rack-bar E works through a pawl K, pivoted within the frame F and adapted to engage notches K', produced in the forward edges of the supporting-bracket members, said pawl being normally held in engagement with the said notches by means of a spring L, attached to a cross-bar M, connecting the side members of the frame, the square portion of the rack-bar working through said cross-bar. A collar N is fixed upon the bar E adjacent to its forward and reduced end, and a coil-spring O surrounds the said reduced end of the bar E and is held between the collar N and the forward member of the frame F. The lower end of this collar N is formed with a rearwardly-projecting lug or finger P, which is adapted to contact with the lower end of the pawl K whenever the rack-bar is forced inwardly.

It will of course be understood that the socket and all the supporting and operating parts are thoroughly insulated, and it will also be understood that the electrical connection between the car and trolley-pole can be effected in any desired manner.

In operation the trolley-wheel is placed in contact with the wire by pulling upon the trolley-pole rope, as usual. When the wheel is in contact with the wire, the pawl K rests in the notch K', and the teeth of the segment D will be in engagement with the teeth of the rack-bar E, the tension of the spring O being sufficient to hold the pole in its elevated position. In case the wheel jumps the wire the pole will move forwardly, and in doing so the toothed segment turning upon its pivot and operating upon the toothed rack-bar will force the said bar rearwardly. As the rack-bar moves rearwardly the lug or finger P comes in contact with the lower end of the pawl K, tripping the same and throwing it out of engagement with the notch K'. The pole will immediately drop rearwardly, and in doing so the frame F is swung upwardly, owing to the engagement of the toothed segment with the rack-bar, and as the frame F turns upon its pivots and swings upwardly the segments G engaging the segments H cause the bail I to move upwardly and meet the pole in its descent, acting as a cushion, taking up the shock, thereby preventing the jar which would otherwise occur, it being understood that any excessive pressure upon the bail will cause the bail to turn slightly upon its pivots, and in so doing the frame F will be turned upon its pivots and the spring O will take up the jar.

It will thus be seen that I provide an attachment which will automatically drop the pole immediately after the wheel jumps the wire and that I also provide for taking up the shock or jar incidental to the quick descent of the pole.

When it is desired to replace the wheel upon the wire, the pole is first pulled down by means of the trolley-pole rope, and this action causes the toothed segment and pawl to resume their normal positions, and the pole can then be allowed to reascend, so as to contact with the wire.

In Figs. 6 and 7 I have shown a very slight modification, avoiding the use of the toothed segments at the ends of the frame and bail, said frame and bail being connected by means of links Q and Q'. The action of the links is exactly the same in both instances, the only difference between the two devices being the different arrangements of the pivotal points.

Having thus fully described my invention, what I claim as new, and desire to secure by Letters Patent, is—

1. In a device of the kind described, the combination with a suitable support, of a pole-socket pivoted thereto, a frame and a bail pivoted also to the support, said frame and bail being operatively connected with each other, said frame carrying a spring-actuated bar operatively connected to the pole-socket and also provided with means for locking the frame and pole in proper position and also means for releasing the said frame and pole.

2. In a device of the kind described, the combination with a suitable support, of a pole-socket pivoted thereto and having a toothed segment at its lower end, a frame and a bail pivotally connected to the support and operatively connected with each other, a spring-actuated rack-bar working in the frame and adapted for engagement with the toothed segment, a pawl carried by the frame and adapted to engage the support, and a tripping device carried by the bar and adapted to engage the said pawl for the purpose of releasing the same, as set forth.

3. In a device of the kind described, the combination with a suitable support, of a pole-socket pivoted thereto and carrying a toothed segment at its lower end, a frame pivoted to the said support and carrying a spring-actuated rack-bar, a locking-pawl and disengaging lug or finger, a bail pivoted also to the support and adapted to operate in unison with the frame but in opposite directions, substantially as described.

4. In a device of the kind described, the combination with a suitable support, of a pole-socket pivoted thereto and having a toothed segment at its lower end, the frame pivoted to the support, the pivotal ends of said frame having toothed segments thereon, a bail pivoted also to the support and having toothed segments at its pivotal ends and adapted to engage the toothed segments upon the pivotal ends of the frame, the rack-bar working in the frame, the pawl carried by the frame and adapted to engage the support, a spring for normally holding the pawl in such engagement, a lug or finger for tripping said pawl, and a spring surrounding the bar and adapted to operate the same, substantially as and for the purpose described.

GEORGE F. NELSON.

Witnesses:
CHAS. E. BROCK,
CLARENCE SHAW.